Aug. 11, 1964      G. M. BOOTH      3,143,881

PNEUMATIC TRANSMITTING MEANS FOR FLOWMETERS

Filed Sept. 7, 1961      2 Sheets-Sheet 1

INVENTOR
George M. Booth
BY
Robert S. Dunham
ATTORNEY

Aug. 11, 1964        G. M. BOOTH        3,143,881
PNEUMATIC TRANSMITTING MEANS FOR FLOWMETERS
Filed Sept. 7, 1961        2 Sheets-Sheet 2

INVENTOR.
George M. Booth
BY
Robert S. Dunham
Attorney

United States Patent Office 3,143,881
Patented Aug. 11, 1964

3,143,881
PNEUMATIC TRANSMITTING MEANS FOR FLOWMETERS
George M. Booth, Westfield, N.J., assignor to Wallace & Tiernan Inc., Belleville, N.J., a corporation of Delaware
Filed Sept. 7, 1961, Ser. No. 136,478
29 Claims. (Cl. 73—209)

This invention relates to pneumatic transmitting means for variable-area flowmeters, and more particularly is directed to apparatus for establishing and transmitting a pneumatic signal or signals indicative of the position of the float in such meters. In a more specific sense the devices and system of the invention are designed to create a pneumatic signal directly proportional to the flow through the meter with which such apparatus is associated.

As will be understood, pneumatic signaling is widely used in the instrumentation of industrial processes and the like; indeed to a considerable extent instrument manufacturers have established standards for such signaling, particularly a signal which varies from 3 to 15 p.s.i. (pounds per square inch, gauge). In this standard range 3 p.s.i. indicates zero value and 15 p.s.i. indicates 100% (maximum value), actual values of flow, speed, pressure, power, or other measured quantities, being then calibrated against the standard pneumatic signal which is transmitted as air pressure in the indicated range. Such pneumatic signaling is used for a variety of remote indicating, remote recording and control purposes, and a number of instrument makers manufacture indicators, recorders and controllers designed to utilize the standard signal.

Some difficulties have heretofore been encountered in attempting to provide transmitting devices for creating a pneumatic signal in accordance with the position or movement of a variable-area flowmeter. Such meters generally consist of an upright tapered tube, having its smaller diameter at the bottom and enclosing a float which rises within the tube to an extent governed by the flow. The inlet is at the bottom of the upright flowmeter tube, the outlet being at the top, i.e. the end of larger diameter. The float, which has a diameter approximately equal to that of the lower end of the tube, assumes a position governed by the flow; as flow increases, the float rises, thus creating an increasing annular space around it large enough to pass the flow at a pressure differential proportional to and created by the weight of the float. Hence the elevation assumed by the float, and likewise the annular area around it, will be proportional to the flow and thus will provide a measure of the flow rate. The float may be guided or free floating, and may be designed, as by selection of its weight, to accommodate any desired range of flows.

While in a glass tube the height of the float can be readily observed so as to take a reading of the flow, e.g. where the fluid is a more or less transparent liquid, or is a gas, there is considerable problem in converting the float position into any sort of a signal which might be remotely transmitted or which might be otherwise required, as where the flowmeter tube or the fluid under measurement is opaque. The chief difficulty is that the float cannot exert appreciable force, without affecting its position. Indeed any friction or other resistance to the travel of the float (under flow changes) and to the attainment of a proper balance position by the float, will impair or destroy the accuracy of reading.

While both pneumatic and electrical devices have been available for detecting the float position and creating a corresponding pneumatic or electrical signal, it is believed that these devices have been no more than moderately satisfactory. For example, in a number of known types of pneumatic device the float has been required to carry a permanent magnet, either in the float body itself or at the head of an extension rod operating within a small diameter tube sealed to the flowmeter tube and extending above or below the latter. While the latter structure, i.e. involving the extension rod and tube, permits arranging a follower quite close to the magnet, the size of the magnet and thus the reliability of following, may be correspondingly limited.

Indeed, the demands of reliability in magnet-type following have generally required relatively large magnets of appreciable weight, so that they can only be used in meters of large size, i.e. large flow response, where the needed magnet weight is less than the total float weight. The nature of the follower must, of course, be such that it imposes essentially no force on the magnet, since any drag would destroy the metering accuracy. Hence the follower must be mounted for nearly frictionless movement. Furthermore, some followers which can follow a slow movement of the float are such that they lose the device if it moves quickly; that is, if a surge or sudden drop in the flow of liquid or other fluid moves the float rapidly beyond the sensing range of the follower, the latter becomes lost, so to speak, with respect to detection of the direction in which the float has moved. This difficulty has only been avoided with some inaccuracy of response or by utilizing long and unduly heavy magnets.

Objects of the present invention are therefore to provide devices and systems which are more sensitive, reliable and accurate than those heretofore generally available, and which provide the desired results with a float-carried structure that can be relatively light in weight. Furthermore, the present improvements are designed to afford a system where the follower device cannot become lost relative to the float. Additional objects are to achieve one or more of these improved results, in the establishment or transmission of a pneumatic signal, while at the same time affording true proportionality of such signal to flow, or indeed permitting automatic correction with respect to any inherent departures of the float characteristic from such proportionality.

To these and other ends, the invention embraces a novel float-sensing arrangement, and in other aspects new features of signal-creating systems, particularly in translating the follower response into a pneumatic signal, as of a desired standard type. As exemplified in the device more particularly described below, the float of the flowmeter, according to the present invention, carries a soft iron rod of small cross-section, and of a length slightly in excess of the maximum float travel. This rod rides in a small diameter extension tube, for example projecting above the flowmeter tube, so that the follower device, here designated a sensor, may be arranged in appropriately close proximity. According to present preference, the sensor comprises a pair of bar magnets arranged in parallel spaced relation and generally aligned with the iron rod or its path, these rods being pivotally mounted, as at their lower ends.

When the piece of soft iron, such as the float-carried rod, appears between the magnets, the soft iron shunts the fields of the magnets, i.e. in effect separating the fields, so that the magnets, which have been disposed with like poles adjacent, exhibit a decrease of their mutual repulsive force. Thus, as the soft iron is introduced between them, the tendency of like poles to repel each other is reduced, in a manner such that the repulsive force varies inversely with the extent to which the thin iron rod enters between the magnets. Although with a considerably larger soft iron element, or at or near maximum insertion of a rather thin element, there may be actual attraction of each magnet to such element (simulating attraction between the magnets), a special feature of invention in the preferred embodiments herein set forth resides in an arrangement of the parts such that there is only a reduction in repulsive force (rather than change to significant forces of attraction) over a useful range of rod positions from no insertion toward maximum insertion. In this situation, attained by readily determinable selection of rod size, the repulsive force varies over the desired range and is caused to act with correspondingly varying effect on a valve element as described below.

Means are therefore provided for converting the changes in magnetic effect of or between the magnets, e.g. the above-described changes in mutual repulsive force (which may be evidenced by only very slight displacements of the magnets), into adjustments of the control element of a suitable valve in a line supplied with air under pressure, for example a needle valve in an outlet of such line. Thus the line pressure is varied in accordance with the extent to which the valve permits relief of such pressure by outward flow of air. The arrangement is advantageously such that the needle force is proportional to the repulsive force of the magnets, i.e. as where the linkage from the latter is arranged to urge the valve toward closed position when the soft iron element moves away from the region of the magnets and allows them to repel each other fully. In consequence, the pressure of air in the line, or in a chamber therein, changes in proportion to the opposing force on the valve, i.e. varies with the force which is exerted by the magnets on the valve needle and which, in varying, permits adjustment of the valve. Stated in another way, the line pressure varies inversely with the amount of relief that is allowed by the closing force on the valve. The pressure thus exhibits a value, at any time, which represents the vertical position of the iron rod, or specifically its end, because the repulsive force on the magnets varies inversely with the amount of the rod which lies between them.

While for some purposes a direct signal may be obtained from instrumentalities of the character just described, linearity of response may be achieved for only a rather limited range of rod, and thus float travel. In consequence, means are further provided to cause the sensor to travel vertically with the rod, the arrangement being of the nature of a servo system whereby the sensor is caused to maintain a definite relation to the rod. This follow-up structure or mechanism is conveniently of a pneumatically actuated character, particularly including means whereby pressure conditions are established in correspondence with the sensor position, in turn yielding a pneumatic signal, as in the standard range.

An effective system for causing follow-up of the sensor and for producing the desired signal in accordance with the location of the sensor and thus in accordance with the float position, involves, first, a valve control chamber having the pressure inside it varied in accordance with controlling pressure changes effected by the sensor device itself. This valve control chamber is conveniently arranged to operate a valve which controls air pressure in a driving chamber, such driving chamber containing a piston mechanically linked to the sensor for moving the latter in accordance with the changes of position of the piston. The piston or equivalent structure being arranged to be displaced, by changes in the pressure of air admitted to the driving chamber, against a restoring force such as a spring, the piston assumes a position which is proportional to the pressure in the driving chamber.

The improved servo system according to the invention thus comprises means receiving signals from the sensor, for converting such signals into adjustment of pressure supplied to an expansible driving chamber, for moving the sensor to a position where a normal signal from the latter will interrupt change of pressure supply to the driving chamber. These instrumentalities are thus arranged to cause the sensor to follow movements of the float, i.e. to maintain a predetermined positional relation to the float, that results in the normal sensor signal. The driving chamber and its actuated element being thus balanced at the desired follow-up position of the sensor, the pressure in the driving chamber constitutes a measure of the sensor position, and may be transmitted as a reliable pneumatic signal, indicating such position.

Further details and features of novelty will be apparent from the following description of certain structures exemplifying the invention, as shown in the accompanying drawings, wherein.

Figures 1, 2, 4:
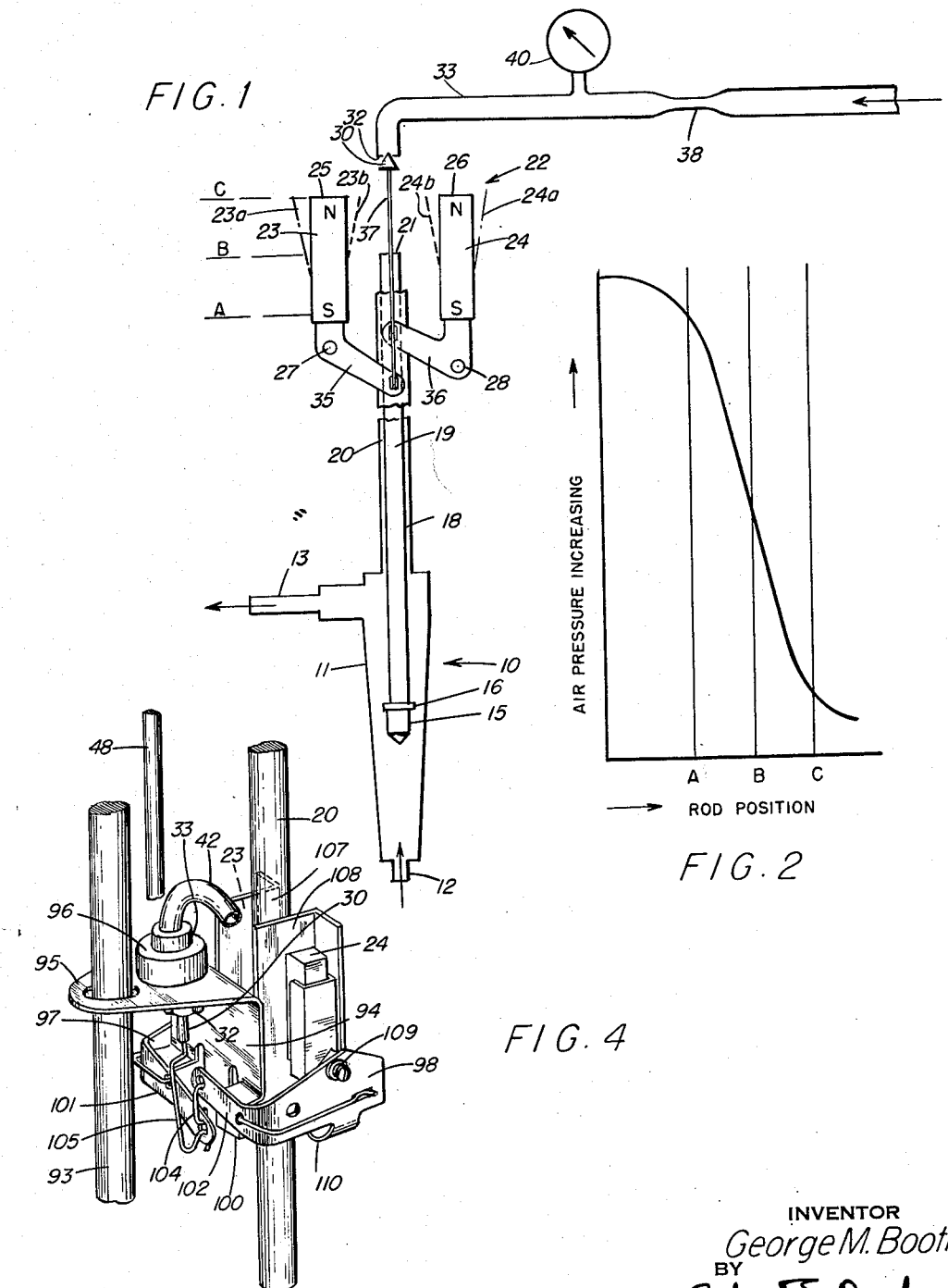
FIG. 1 is a simplified, largely diagrammatic view of a sensor device corresponding to the invention, arranged with a flowmeter.
FIG. 2 is a graph illustrating the relation between the position of a float carried rod and the pressure variatons directly controlled by the sensor, in FIG. 1.
Figure 3:
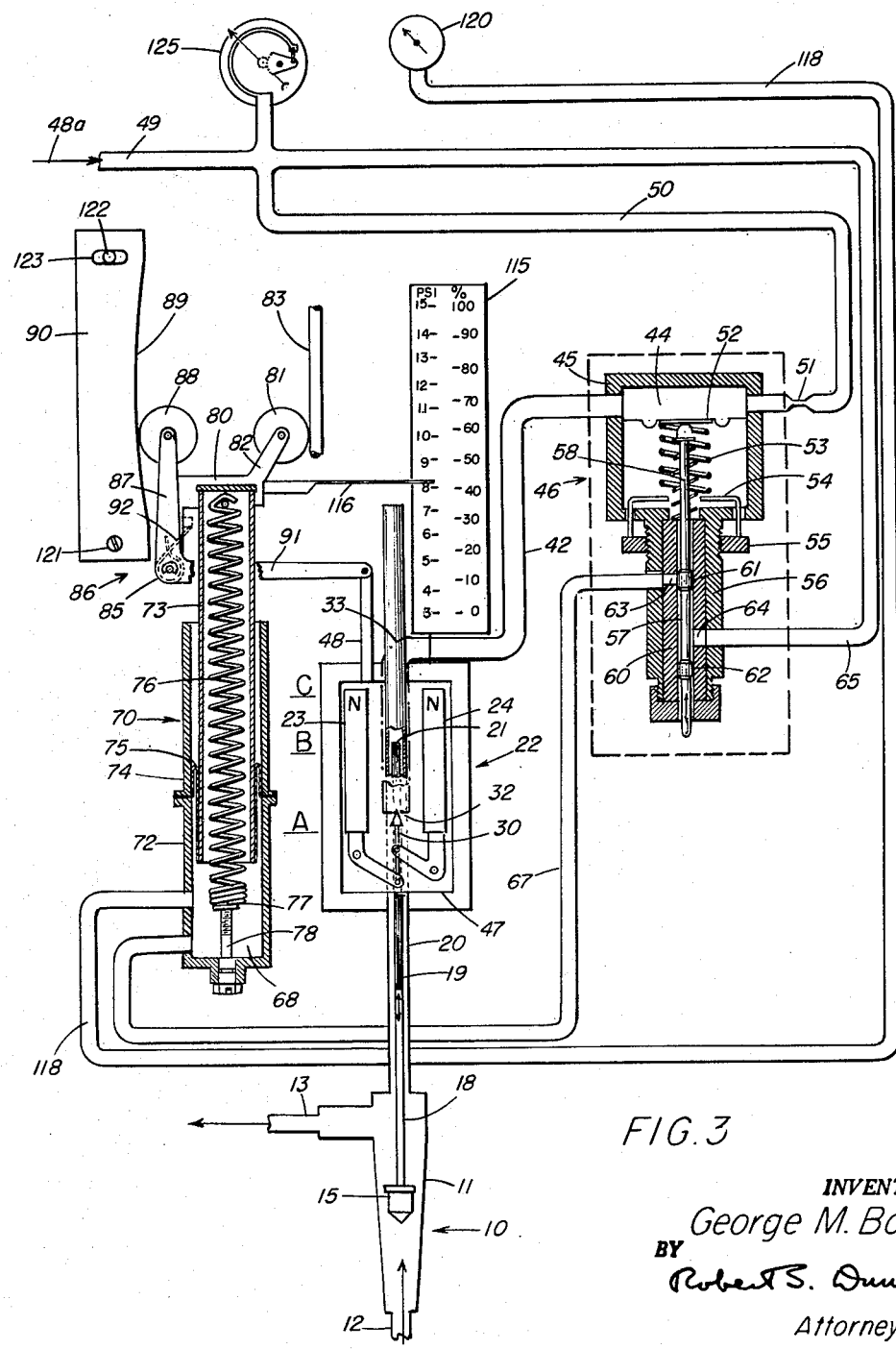

FIG. 3 is an elevational lay-out, with a number of devices in vertical section and with structural parts simplified for clarity of illustration, showing a complete signal-establishing system according to the invention and including a sensor such as shown in FIG. 1; and FIG. 4 is an enlarged perspective view, showing the structure of one form of sensor device embracing an arrangement of elements such as illustrated in a simplified way in FIG. 1.

Referring first to FIG. 1, the flowmeter 10 comprises an upwardly flaring vertical tube 11 through which the flowing fluid to be measured, e.g. liquid, passes from an entry port 12 at the bottom, to an outlet passage 13 adjacent the upper end. Within the tube a float 15 is disposed, carrying, for example, at its upper end a metering disk 16 which may have a diameter equal to or only very slightly less than the internal diameter of the tube 11 at or near the lower end of the latter. The float may be a generally cylindrical member of metal, contoured as desired to suit its function and having a weight appropriate for the range of liquid flow rates to be measured. In particular, the float is designed, in accordance with known principles of the art, so that at minimum or zero flow it occupies its lowermost position in the tube, and rises with increase of flow, assuming a position at any time, which corresponds, more or less proportionally, to the actual flow rate. Suitable guiding means (not shown), such as internal ribs on the tube, may be provided for the float if desired, and for a direct reading, its position may be observed, i.e if the tube 11 is transparent.

In accordance with the present invention, the float carries an upstanding rod structure 18 which at least in its upper part constitutes a soft iron rod 19, this float-carried rod arrangement 18–19 being conveniently thin, i.e. of small diameter, although shown in FIG. 1, for clarity, as relatively massive. The rod device 18–19 mounted on the float and thus moved up and down with the latter, is arranged to travel freely in a guide tube 20 which is sealed at its lower end to the closed top of the meter tube 11 and is closed at its upper end at a locality (not shown) above the uppermost point to which the top 21 of the soft iron rod 19 may rise. For clarity of illustration, the upper part of the tube 20 is omitted in FIG. 1. The tube 20 may be made of appropriate nonmagnetic material, such as glass, plastic, aluminum, brass or the like.

The elements of the sensor device 22 comprise a pair of permanent magnets, e.g. bar magnets 23, 24, arranged at opposite sides of the path of the rod section 19, externally of the tube 20 and in appropriately spaced relation so that they may rock toward the rod under suitable conditions as described below. The magnets are disposed with like poles opposite each other, for instance as shown so that the north poles 25, 26 of the two bar magnets 23, 24 are at the top. The magnets are pivotally mounted on suitable supporting structure, not shown in FIG. 1, as by pivots 27, 28 at their lower ends or in appropriate elements which serve to carry the magnets in the described relation. Each magnet thus constitutes a device adapted to rock about its defined pivot, the magnet structures having further means for positioning the needle or valve element 30 of a valve having an open seat 32 for such element, the valve seat and an appropriate portion of its connecting tube 33 being likewise carried by the structure (not shown) to which the magnets are pivoted. Specifically, the magnets 23, 24 may have appropriate bell crank arms 35, 36 which are linked or pivotally connected to the operating rod 37 of the valve needle 30. As will be appreciated, the linkage of the magnets to the rod 37 is such that they move the needle element 30 toward and away from the seat 32, in accordance with the positions of the magnets about their pivots.

Specifically, it will now be seen that when the soft iron rod 19 is withdrawn from a position such as shown, i.e. by descent of the float 15 to a lower or lowermost position, the magnets are more strongly repelled by each other, particularly at their north pole ends 25, 26. Thus in such situation the magnets tend to swing outward away from each other about their pivots 27, 28, in a direction toward the dot-and-dash lines 23a, 24a, the effect of special significance, however, being that they exert greater closing force on the valve needle 30, thereby allowing air pressure to build up in the line 33.

If and as the iron rod 19 is then moved back up between the magnets to the position shown, for example by increase in fluid flow through the meter 10, the rod provides a path of lower reluctance for the external flux of each magnet, thereby reducing their mutual force of repulsion. Slight displacement of the magnets inward, back to or near their solid line positions, can then occur; that is to say, the closing force on the valve (being the force of magnet repulsion) has been reduced, whereby the rod 37 and the valve needle 30 can move slightly downward for greater relief of pressure in the line. It will be understood that air under pressure is supplied to the line or tube 33, conveniently through a restriction 38 in such tube, and the actual pressure in the line at any time is that which produces a force on the valve element equal and opposite to the valve-closing force furnished by the mutually-repelled magnets 23, 24, the excess pressure (to make up the higher value upstream of the restriction) being relieved or accounted for by flow of air through the valve. Hence when the repulsive force of the magnets is reduced (as by the above-described restoration of the rod 19 to the position shown from a lower position), there is less force on the valve, and it can open further to allow greater discharge of air and consequent reduction of pressure in the region of the line 33 downstream of the restriction 38. It will now be seen that the pressure exhibited in the line, as determined by the reading of a gauge 40 connected to it, is governed by the position of the upper end 21 of the rod 19, and thus represents the position of the float 15 and the value of flow through the meter 10.

If the rod 19 is moved further upward, e.g. by elevation of the float 15, due to still greater flow, the shunting path for the magnet flux is greater and the magnets tend to move further inward, toward the dotted line positions 23b, 24b. Such displacement of the rod reduces the repulsive force of the magnets still more, allowing the valve needle to move further down, opening the valve wider and causing additional drop in the pressure as read by the gauge 40. It will be understood that the dotted lines 23a, 24a, 23b, 24b, are shown essentially for convenience of explanation; in practice, the valve 30 can be so sensitive that the range of movement of the magnets, corresponding to the working ranges of magnet repulsive force and of pressure in the line 33, may be scarcely more than perceptible.

As will now be seen, the illustrated device, in FIG. 1, effects adjustment of the force on the needle valve 30 in accordance with the position of the float 15, and more specifically in accordance with the supported iron rod 19, whereby the pressure in the line 33 is made to vary in proportion to the positional adjustments of the float and rod relative to the magnets. With the upper end 21 of the rod at or above an uppermost position C, the magnets are fully shunted and the valve is furthest open. At or below the lowermost position A, the rod end 21 is essentially below the magnets and their mutual repulsion keeps the valve in its most nearly closed position. At an intermediate location, e.g. position B, there is a correspondingly intermediate opening of the valve.

In preferred embodiments the basic control is exercised by change in the force of magnetic repulsion (as applied against the valve), rather than by measured or measurable movement of the valve needle. Although under some circumstances, as where the rod is heavy enough to provide actual attraction of the magnets and there is some separate loading or restoring means, the arrangement can be made to yield proportional changes of position, e.g. of a pressure-controlling valve, the system is advantageously such as described above, i.e. working only in a range of magnet repulsion and with relatively small displacements of the valve element. The difference of line pressure between the minimum and maximum conditions A and C can nevertheless be relatively substantial, while the device exhibits high sensitivity of response.

As explained, the force on the needle 30 is proportional to the repulsive force of the magnets, and the air is supplied at a pressure somewhat greater than the quotient of the maximum needle force divided by the area of the seat, whereby some air is always bleeding. The cross-section of the restriction 38 is also preferably no more than a fraction of the seat area 32; in consequence (as likewise indicated above) only a relatively small opening of the needle 30 is needed to reduce the pressure in the tube 33 to nearly atmospheric value.

By virtue of the arrangement shown in FIG. 1, the gauge 40 affords indications of the level of the float 15, over a range of positions corresponding to the vertical height of the magnets between the levels A and C, higher pressure readings representing lower rod position and vice versa. The relationship of pressure to rod position is indicated in FIG. 2, i.e. particularly the relation between the upper end 21 of the rod and the various levels of the magnets as represented by the horizontal lines A, B and C described above. Above region C and below region A the position of the rod has relatively little effect, but there is a very substantial drop of pressure as the rod rises above A up to the level C. Over a considerable middle portion of this range, the relationship is fairly linear, i.e. the curve is a substantially straight line. Correspondingly, pressure readings on the gauge 40 represent a desirably linear measurement of the flow changes in the meter 10 over the intermediate straight line portion of the curve in FIG. 2, and to such extent the device of FIG. 1 provides for establishment and transmittal of a pneumatic signal indicating the float position.

For many purposes, however, the range of float displacement represented by movement through the intermediate part of the path between levels A and C is considerably less, or often far less, than the total range of flowmeter travel which can be accommodated and which must be measured, in practical work. For instance, a sensitive and reliable sensor device embodying bar magnet elements of the sort shown in FIG. 1 may have a distance from A to C of 0.75 inch. In such case it appears that the linear part of the curve in FIG. 2 is equivalent to about 0.4 inch of rod (i.e. float) travel. In a common design of variable area meter, the vertical range of float travel is a matter of at least several inches or more, one standard design being such as to have a float travel from minimum to maximum of 5 inches. While the device of FIG. 1 may conceivably be made with longer magnets 23, 24, accuracy and proportionality are apt to suffer with excessive magnet length. Special taper or shape of the rod 21 may, as will now be appreciated, be such as to improve the accuracy of response for the use of long magnets to accommodate longer strokes, such shaping being designed to control the response curve between the iron rod position and the resulting air pressure. Some utility for the device as shown in FIG. 1 is thus conceived in situations where only moderate or low accuracy is required.

For highest accuracy and a minimum of empirical adjustment in design, however, the system of the invention preferably includes a servo system, e.g. a pneumatic means, for causing the sensor to move vertically with the rod and float, and thus to follow the latter while establishing, through intermediate means, pressure changes to constitute the desired pneumatic signals. Referring to FIG. 3, the system shown includes the same flowmeter 10 having the vertical tapered tube 11 and containing the movable float 15 which carries the soft iron rod 19 within the closed extension tube 20. The sensor device 22 is arranged to move bodily up and down the tube 20, so that it may follow the movements of the rod 19 and in particular may maintain a desired normal relation between the magnets 23, 24 and the upper end 21 of the rod 19. Further details of the sensor being essentially as in FIG. 1, description of them is not here repeated. The tube portion 33, however, which opens at the seat of the needle valve, is continued with a flexible tube 42 into the upper chamber 44 of a chamber housing 45 of a valve control device 46. The supporting structure of the sensor 22 is indicated at 47, being mounted on a vertical connecting rod or link 48, the latter being in turn supported and moved by means to be described below.

The chamber 44 of the device 46 is connected to a source of air under pressure as indicated at 48a, by tubes 49, 50, the latter entering the chamber and including a suitable orifice 51 which corresponds to the orifice 38 in FIG. 1, i.e. whereby a condition of pressure is established in the chamber, in proportion to the closing force on (and inversely in accordance with flow of air through) the valve element 30 of the sensor 22, also shown in FIG. 1. The device 46 includes a diaphragm 52 closing the lower end of the chamber 44 and thus constituting the latter as an expansible chamber, the diaphragm being urged upward by a coil spring 53 under compression. The lower end of the spring 53 seats against a support 54 carried by a collar 55 which is threaded on a lower cylindrical housing 56, whereby the extent of compression of the spring 53 may be adjusted.

A valve stem 57 is held against the lower face of the diaphragm 52 by a coil spring 58 under compression, such valve stem traversing a barrel 60 retained within the lower cylindrical housing 56 and carrying a pair of spaced cylindrical valve elements 61, 62 in close sliding fit in the barrel. This arrangement thus constitutes a slide valve operated by the diaphragm 52. The barrel has vertically spaced ports 63, 64, so arranged in coaction with the closure elements 61, 62 carried by the stem 57 that at an intermediate or normal position of the diaphragm 52, the element 61 closes the port 63. Upon increase of pressure in the chamber 44 the stem is urged downwardly, so that the port 63 is vented to the atmosphere through the upper part of the barrel, while element 61 continues to prevent communication with the port 64. Upon decrease of pressure in the chamber 44 the stem rises, elevating the member 61 and allowing communication between the ports 63 and 64. The element 62, in the device shown, not only closes the lower end of the barrel and guides the valve stem, but also balances the element 61 as to force on these elements due to pressure of supplied air (port 64); hence valve positioning is unaffected by changes in such pressure. The port 64 is supplied with air under pressure from the source 48a by a tube 65 extending to the tube 49, while the port 63 communicates through a tube 67 with the piston chamber 68 of an air-actuated servo device 70.

The device 70, which is designed to displace the sensor 22 so as to follow movements of the rod 19 and the float 15, comprises an outer cylindrical casing 72 to enclose the chamber 68 at the bottom, and a hollow cylindrical piston 73 therein, the piston being closed at the top and opening at its lower end to the chamber 68. A rolling diaphragm between the housing 72 and the cylindrical piston 73 seals the annular space between the piston and housing, such diaphragm consisting of a sleeve of highly flexible material connected at its opposite ends respectively to the housing and piston and arranged to be turned on itself to a greater or less extent, as the piston moves, whereby the diaphragm in effect rolls at its circular fold 75. The piston is urged downwardly by a coil spring 76 under tension, extending from the upper end of the piston to a retaining nut 77, threaded on a supporting post 78, the latter being rotatable relative to the nut, for adjustment of the tension of the spring.

Although in some cases the piston 73 may be arranged to drive the sensor 22 by a simple direct connection or linkage, a presently preferred arrangement includes structure whereby the actual movements of the piston necessary to cause follow-up displacement of the sensor 22 are modified in a predeterminable manner, e.g. to correct for non-linearity of the elevation of the float 15 with respect to changes in fluid flow through the meter 11. To such end, a guiding and compensating structure is provided, including a head or supporting member 80 carried by the upper end of the piston 73. One guide roller 81, journaled on an arm 82 of the support 80 bears on a guide rod or bar 83, which affords a vertical straight-line path for such roller. Pivoted at 85 to another, downward arm of the structure 80, bell crank lever 86 has an upwardly extending arm 87 to which a second roller 88 is journaled so as to ride on a generally upright cam surface 89 of a cam member 90. The horizontal arm 91 of the bell crank is pivoted to the upper end of the connecting rod 48 of the sensor. Means such as a wire spring 92 wrapped one or more turns around the pivot shaft or support of the bell crank lever urges the latter in such direction, i.e. counterclockwise as shown, so as to keep the roller 88 in engagement with the cam surface 89. The cam is cut to suit the particular design of flowmeter 11 with which the apparatus is associated, for example providing the cam surface 89 with a concave contour, whereby movements of the piston 73 and its head 80 may be linearly proportional to changes in flow through the meter, while the sensor is caused to follow actual float displacements that depart from strict linearity in a known manner.

A more complete illustration of one form of sensor 22 is given in FIG. 4, where the extension tube 20 is shown, and likewise a vertical guide rod 93, it being understood that the soft iron rod 19 (not here indicated) travels within the tube 20. The device includes a box-like supporting structure 94 of non-magnetic material, such as brass, aluminum, rigid plastic or the like, having a flange or bracket 95 which is apertured to be guided by the rod 93 and which carries a valve seat element 32 and an appropriate pipe fitting 96 for the latter, to provide mounting and connection of the tube portion 33 and the flexible tube 42.

The permanent bar magnets 23, 24 are carried by horizontally L-shaped supports 97, 98 which are each pivoted to rock about a horizontal axis at or below the bottom of the magnet, for instance as on a wire pivot 100 shown for the magnet 24. These rocking members 97, 98 have substantially horizontal arms 101, 102, respectively, corresponding to arms 35, 36 of FIG. 1, which are in practice disposed each at a small angle to the horizontal so that their inner ends, spaced vertically, are connected by a vertical link 104, with appropriate linkage from one of them, as by the connecting rod 105, to actuate the valve element 30. In this view (FIG. 4), it may be assumed that the magnets 23, 24 are to be free to move in a small angular range about the pivots, as within a wider angular range extending outward from the outer faces of a pair of upright guide or shield members 107, 108 constituted as parts of the support 94. bearing screws such as shown at 109 for the magnet 24 may be arranged to make any desired or necessary adjustment in angular position of the magnets relative to the arms 101, 102 and the rod 105 through which the forces of magnet repulsion are transmitted to the valve element. The magnets are carried by the inner arms of upright, stiffly resilient U-shaped portions of the pivoted members 97, 98, while the screws, as the screw 109, extend, in effect, from the outer arms of the U-pieces to and against the magnets; hence the above adjustment is readily effected by turning and locking the screws.

The sensor shown in FIG. 4 is adapted to be moved up and down by the connecting rod 48 with appropriate sliding guide by the rod 93 and the portions of the support adjacent the tube 20. The magnets are arranged with freedom to rock, for effective translation of their force of repulsion into closing force on the valve element 30 (see FIG. 1) carried by the rod 105, such force varying inversely in accordance with the extent of entry of the soft iron rod (in the tube 20) between the magnets.

Referring now again to FIG. 3, the operation of the follower and transmitter will be readily understood. The parts are illustrated at a condition of balance or equilibrium, with the sensor 22 positioned to agree with the meter float 15, for example so that the upper end of the rod 19 is disposed at a predetermined level more or less midway between the upper and lower ends of the magnets 23, 24. That is to say, the initial adjustments of the slide valve device 46 are selected so that at the stated mid-point position of the rod 19 the pressure in chamber 44 determined by the corresponding positioning force of the magnets on the valve element 30 locates the valve stem 58 with its element 61 blocking the port 63. No pressure change in the sealed piston chamber 68 is then possible, nor ingress or egress of air, so that the sensor 22 is kept at the assumed position of the piston, the latter being determined by balance of its contained internal pressure against the tension of the spring at this state of extension.

It is now assumed that there is an increase in the fluid flow through the meter 11; the iron rod 19 is raised by the upward movement of the float 15, causing decrease in the mutual repulsion of the magnets 23 and 24. Less force acts on the valve element 30, so that it opens further, causing reduction of pressure in the chamber 44 and allowing the diaphragm 52 to move upward under the action of the spring 53. The valve stem 58 likewise moves upward, raising the element 61 to a position uncovering the port 63 and allowing air under pressure to flow from the source 48a through the lines 49, 65, port 64, the interior of the barrel 60, port 63 and line 67 to the chamber 68. In consequence the piston 73 of the servo or actuator device rises, carrying with it the sensor 22. It will be understood that until the piston started to move, the reduced force of the magnets 23, 24, on the valve element 30, which initiated this series of steps, has been balanced by the force of the reduced pressure in line 42 and chamber 44, the function of the valve element being such as to tend to maintain equality of line pressure and needle force at all times.

During the described upward movement of the piston and sensor (resulting from reduced pressure in the chamber 44) the magnets are moving upward relative to the end of the rod 19, i.e. so that the latter in effect moves toward its original or normal position. In consequence the force of repulsion between the magnets increases, applying greater closing force on the needle valve element 30; these effects continue until the normal position of the sensor relative to the rod is reached, re-establishing the original, normal pressure in chamber 44. The slide valve is thus returned to its illustrated position, interrupting air supply to the piston chamber 68 and closing the latter, so that the piston is brought promptly to rest. The increased valve-closing force on the element 30 is also again balanced by the increased pressure in the line 42 and chamber 44. In this fashion, the sensor has been moved to follow up the change of position of the rod 19, and thus of the float 15.

If there is a decrease in fluid flow through the meter 11, so that the rod 19 falls, the corresponding greater repulsion of the magnets exerts greater closing force on the needle element 30, raising the pressure in chamber 44 and shifting the slide valve element 61 downward. In such relation, air is bled or vented from the piston chamber 68, through the line 67, port 63 and the upper portion of the barrel 60. With correspondingly reduced force on the piston, it descends under the action of its spring 76, causing the sensor 22 to follow the rod 19 and to assume a new location where the normal, mid-positional relation of rod and magnets is resumed and where the normal pressure in chamber 44 is consequently restored. In the latter condition, loss of air and pressure from the chamber 68 is interrupted by re-positioning of the valve element 61, causing arrest of the piston 73 and the sensor in the desired new location. As will be seen, the sensor 22 is thus caused to follow the movements of the float guide exactly, and to maintain a corresponding vertical position, with virtually no drag on the iron rod or float. The servo system is found to be highly accurate and very sensitive in its response, for example in that small changes of rod position, even within the range between the upper and lower ends of the magnets, are sufficient to trigger the described sequence of steps in the servo operation, with corresponding following adjustment of the sensor.

By virtue of the linkage to the sensor through the swinging element 86 having its roller 88 guided by the curved cam face 89, accurate positional follow-up of the sensor, which may in fact be slightly non-linear in relation to flow changes through the meter, is translated into vertical movement of the piston head 80 that may bear an accurately linear relation to such flow changes. Accordingly a visible scale 115 may be arranged to be swept by a pointer 116 carried on the piston head 80, with the graduations of the scale arranged in uniform manner, to read in flow units or other representation of flow value. The scale can be marked in actual units of flow or as conveniently indicated, in percentages of maximum flow and in units of pressure variation within the operative signaling range of 3–15 p.s.i., described above.

It will now be seen that a tube or other line 118 extending from the piston chamber 68, may afford a means of communicating the pressure in such chamber to a remote locality, e.g. to a remotely situated gauge 120. Since the sole restoring force on the piston is the spring 76, the piston position varies linearly with the pressure in the chamber 68, and since the pressure established in the chamber at any position of the sensor is governed directly by the location of the float, readings of the remote gauge 120 are exactly translatable as flow rates through the meter 11. In other words, the pressure in the piston chamber varies with, and only with, the vertical elevation of the float 15, while the pressure variations are rendered linear, relative to flow, by virtue of the arrangement including the cam 90 and the roller 88. In consequence the device constitutes a transmitter of pressure signals, which indicate the fluid flow and which may conveniently bear the desired linear relation, for corresponding uniform graduation of the scale (not shown) in the remote meter 120. As will be appreciated, any appropriate device may be used to respond to the pressure signal from the chamber 68, not only a gauge as shown at 120, but other indicating, recording or controlling instrumentalities, preferably such as are designed to receive signals of the standard range for pneumatic systems.

The apparatus is readily adjustable to suit the particular requirements of various flowmeters or floats as may be desired to be used at the indicated locality of the meter 11. For instance, the stud or screw 78 in the actuator 70 is adjustable to align the pointer 116 with the lower end of the scale 115, as at the 3 p.s.i. mark representative of zero flow in standard pneumatic transmitters. Indeed such adjustment may be effected to achieve such alignment when the pressure in the chamber 68 exactly equals 3 p.s.i. The connecting rod 48, as by its threaded connection to the sensor 22 (FIG. 3), can be adjusted to vary the distance between the lever arm 91 and the sensor, so as to set the piston at its zero or 3 p.s.i. mark when the meter float 15 is actually in zero flow position.

A further adjustment is possible with respect to the cam 90, for example by providing a pivotal mounting 121 for the lower end of this cam and securing its upper end by a screw 122 in a horizontal slot 123 of the cam. By setting the cam element, when locked with the screw 122, in a desired position of adjustment through the range of the slot, the span of the transmitter is varied. That is to say, adjustment of the span affords matching of the device to a meter 11 which has a range of float travel that is not exactly the same as the vertical height of the scale 115. As will be appreciated, the normal pressure to be maintained in chamber 44, i.e. a suitable value of same relative to the design of the valve element in the sensor, is adjustable by changing the compression of the spring 53. For insurance that adequate air supply is available at all times, a pressure gauge 125 may be connected to the air input line 49.

It will now be seen that the described system affords means for continually transmitting a pressure signal representative of meter float position, without imposing any sensible force on the float itself. The sensor, which is caused to follow the float movements quite precisely, achieves its superior function by reason of the disposition of its magnets on a plurality of sides of the soft iron rod. With the described disposition, the forces acting on the magnets, are equal and opposite, and furthermore are horizontal rather than vertical; hence such forces do not affect the freedom of the rod and float to move. The particular arrangement of the magnets on each side of the soft iron, plus the fact that the magnet forces are added together by the levers 35, 36 (or 101, 102), enhances the accuracy of following. For instance, if the soft iron is off-center in the space between the magnets, the result is unaffected, for all practical purposes; as the space between the one magnet increases, the space on the other side decreases. While this compensation is not perfectly complete, it is essentially sufficient to permit practical manufacturing tolerances, with regard to the necessary clearances involved. In essence, the combination of the described sensor with a servo system as of the sort shown, approaches the inherent accuracy of a null balance measuring system, the only difference being in the fact that only a constant sensor control pressure, rather than a zero value, is required.

Indeed, it is unimportant, within limits, what the exact value of the normal or control sensor pressure (in line 42 and chamber 44) may be, the criterion being simply that it remain constant after initial adjustments of the instrument. As will be seen, the sensor pressure, herein designated as normal, which exists at balance, is a function of the area of the diaphragm 52, the force of the spring 53 and the relation of these values to the valve spool and the side ports in the barrel 60. All of these structural parameters may vary over a wide range yet provide a device which will respond sensibly to a signal which is greater or less than the normal.

The selected relationship between the top end of the soft iron rod 19 and the magnets, as likewise the exact size of the rod, is not critical within reasonable limits. The balance relation between the end of the rod and the magnets adjusts itself to the other factors involved, e.g. it being relatively unimportant whether balance exists at point B on the curve of FIG. 2 or at some other locality on the steeper portions of the curve. The exact point of balance is readily compensated for, in all cases, by adjustment of the connecting rod 48.

Finally, it will be noted that even though the float may carry the rod 19 up or down faster than the servo mechanism may move in its following action, the sensor cannot become lost. For instance, if the flow through the meter should be maximum and suddenly drop to or near zero, so that the rod is completely withdrawn below the sensor, the servo system will always necessarily move downward, indeed as fast as it can. It will eventually complete this corrective action when it catches up with the rod end. Correspondingly a sudden rise of the float and rod to a point far above the magnets, will only and necessarily cause an upward travel of the servo device, again until the corrective action arrests the mechanism when it has reached a position of normal relation to the rod. Conveniently, of course, the soft iron portion 19 is somewhat longer than the maximum travel of the float, so that in no case can the lower end of the soft iron element rise above the bottom of the sensor.

It will be understood that the invention is not limited to the specific devices herein shown and described, but may be embodied in other forms without departure from its spirit.

I claim:

1. In apparatus for transmitting the measurements of a variable-area flowmeter, the combination with an upright flowmeter tube and a float vertically movable in accordance with changes in flow through the tube, of a member of magnetic material carried by the float and sensing means arranged adjacent to the vertical path of the member, said sensing means comprising a plurality of magnets disposed with respective regions of like polarity in mutually opposed relation at different sides of said path of the member, said magnets being mounted for movement of said regions thereof in directions transverse of said path, and said magnets being disposed for predetermined mutual repulsion of said regions when said member is vertically remote from said sensing means, and for less repulsion of said regions of the magnets when the member is interposed in a locality between said regions, and means controlled by said magnets and responsive to change of the force of repulsion between said regions thereof, for signaling change of position of said member, in its path, into and away from the aforesaid locality.

2. Apparatus as defined in claim 1, in which the sensing means is mounted to move vertically along the path of the member, and which includes pneumatically actuated means including a drive element, for moving the sensing means vertically, said pneumatically actuated means containing fluid under pressure which varies with the position of the drive element, means controlled by said signaling means in response to displacement of the member from a predetermined position in said locality, for controlling the pneumatically actuated means to effect movement of the sensing means to a location where said member is restored to said predetermined position, and means for transmitting a fluid pressure signal from the pneumatically actuated means.

3. Apparatus as defined in claim 2, wherein the float is vertically movable through a predetermined distance corresponding to a range of flows to be measured, and wherein said member has a vertical length at least about equal to said distance, said magnets being arranged for diminution, by the member, of the mutual repulsion of said regions thereof to an extent which varies with change in the location of a predetermined end of the member vertically in said locality, said means for controlling the pneumatically actuated means being arranged for response to departure of said end of the member from a selected intermediate position in said locality, said selected position constituting the predetermined position to which the member is restored by movement of the sensing means.

4. In apparatus for transmitting the measurements of a variable-area flowmeter, the combination with an upright flowmeter tube and a float vertically movable in accordance with changes in flow through the tube, of a member of magnetic material carried by the float and sensing means arranged adjacent to the vertical path of the member, said sensing means comprising a pair of magnets disposed, at respectively different sides of said path of the member, with a pole of one magnet in opposed relation to a like pole of the other magnet, said magnets being mounted to rock for angular displacement of said poles toward and away from said path, and said magnets being disposed for mutual repulsion of said poles when said member is vertically remote from said sensing means, and for diminution, by said member, of the said repulsion of said magnet poles when and as the member is moved into a locality between them, and means controlled by said magnets and responsive to change of force of repulsion of their aforesaid poles in their paths of angular displacement, for signaling change of position of said member, in its path, into and away from the aforesaid locality.

5. Apparatus as defined in claim 4, in which the sensing means is mounted to move vertically along the path of the member, and which includes pneumatically actuated means for moving the member vertically, and means controlled by said signaling means in response to displacement of the member from a predetermined position in said locality, for controlling the pneumatically actuated means to effect movement of the sensing means to a location where said member is restored to said predetermined position, said pneumatically actuated means comprising a driving element moved in one direction by fluid under pressure and having spring means for displacing it in the opposite direction, so that the pressure of fluid in the pneumatically actuated means varies in accordance with the position of the driving element, means for transmitting a fluid pressure signal from the pneumatically actuated means, and a driving connection intermediate said driving element and the sensing means, having means responsive to change of position of the element for modifying the relative positions of the element and sensing means in accordance with a predetermined relationship, whereby fluid pressure in the pneumatically actuated means measures the position of the float in accordance with a relationship different from a linear proportionality to float position.

6. In apparatus for transmitting the measurements of a variable-area flowmeter, the combination with an upright flowmeter tube and a float vertically movable in accordance with changes in flow through the tube, of a vertically elongated member of magnetic material carried by the float and sensing means arranged adjacent to the vertical path of the elongated member, said sensing means comprising a pair of magnets disposed upright with like polar portions at one end of each in respectively opposed relation at opposite sides of the path of the elongated member, said magnets being mounted to rock about axes in a plane transverse of said path, and said magnets being disposed for mutual repulsion when the elongated member is vertically remote from said sensing means, and for diminution, by said member, of the said repulsion of the magnets when and as the member is moved between them, and means controlled by said magnets and responsive to their forces of magnetic effect as translated angularly about their aforesaid axes, for signaling the extent to which said elongated member is present in a predetermined vertical region of influence of said member on the magnets.

7. In apparatus for transmitting the measurements of a variable-area flowmeter, the combination with an upright flowmeter tube and a float vertically movable in accordance with changes in flow through the tube, of a member of magnetic material carried by the float, sensing means arranged adjacent to the vertical path of the member, said sensing means comprising a plurality of magnets disposed with respective regions of like polarity in mutually opposed relation at different sides of said path of the member, said magnets being mounted for movement of said regions thereof in directions transverse of said path, and said magnets being disposed for mutual repulsion of said regions when said member is vertically remote from said sensing means, and for diminution, by said member, of the said repulsion of said regions when and as the member is moved into a locality between said regions, chamber means arranged to receive fluid under pressure from a source thereof and having adjustable outlet means, to provide translatable change in pressure in the chamber in response to change of fluid flow through the outlet, and means controlled by said magnets and responsive to change of the force of repulsion between said regions thereof, for adjusting the aforesaid outlet means.

8. Apparatus as defined in claim 7, wherein the sensing means is mounted to move vertically in alignment with the member and wherein the adjustable fluid outlet means is carried by the sensing means, and comprises an outlet, flexible fluid conduit means extending therefrom to the chamber means and a needle valve element adjustably positioned in said outlet, said adjusting means comprising means linking said element to the magnets.

9. In apparatus for transmitting the measurements of a variable-area flowmeter, the combination with an upright flowmeter tube and a float vertically movable, in accordance with changes in flow through the tube, through a predetermined distance corresponding to a range of flows to be measured, of a member of magnetic material carried by the float and having a vertical length at least about equal to the aforesaid distance, sensing means movable vertically in alignment with the member and including magnetic means which is magnetically sensitive along the vertical region of the sensing means of predetermined vertical extent and which is variably responsive to the complete presence, partial presence and complete absence of the said member in said vertical region of said sensing means, means for displacing said sensing means upward and downward along the path of the aforesaid member, and means controlled by the magnetic means and responsive selectively to the complete presence and complete absence of the member in said region, for controlling said displacing means to move the sensing means respectively in one direction or the other toward a position where a predetermined end of the member is partially present in said region, said last-mentioned controlling means including means responsive to said partial presence of the member for interrupting operation of the member for interrupting operation of the displacing means, to arrest the sensing means in a predetermined position of partially presence of said member in said region, the vertical length of the aforesaid member being substantially longer than the said vertical extent of said region of the sensing means by a sufficient amount such that on maximum departure of the member, as carried by the float within said range of flows, in one direction from said predetermined position of partial presence in the region, there is complete presence of the member in the region, and such that on like maximum departure of the member in the opposite direction, there is complete absence of the member in the region.

10. In apparatus for transmitting the measurements of a variable-area flowmeter, the combination with an upright flowmeter tube and a float vertically movable in accordance with changes in flow through the tube, of a control chamber arranged to receive fluid under pressure from a source thereof and having an adjustable outlet, to provide variable pressure in the chamber in accordance with the flow of fluid through the outlet, a member of magnetic material carried by the float, sensing means magnetically controlled by said member in accordance with the vertical position of the float for controlling the aforesaid fluid outlet of the chamber, to modify the pressure in the chamber upon displacement of the member from a predetermined normal position relative to the sensing means, pneumatically actuated means, including a drive chamber, for vertically moving the sensing means, and control valve means for said pneumatically actuated means, having a control element associated with the control chamber and adjustable in accordance with the pressure therein, selectively to supply and discharge fluid respectively to and from the drive chamber, to move the sensing means in one direction or the other until the member again occupies said normal position, upon said displacement of the member therefrom, said sensing means comprising means magnetically sensitive to the aforesaid member and mounted for movement relative to the sensing means, and a valve connected to said magnetically sensitive means for adjustment in accordance with influence of the member on said magnetically sensitive means, said valve being arranged to control the fluid outlet of the chamber for variably modifying the pressure therein in accordance with change of influence of said member on said magnetically sensitive means, and said valve being mechanically carried with the sensing means for movement therewith.

11. In apparatus for transmitting the measurements of a variable-area flowmeter, the combination with an upright flowmeter tube and a float vertically movable in accordance with changes in flow through the tube, of a chamber arranged to receive fluid under pressure from a source thereof and having an adjustable outlet, to provide variable pressure in the chamber in accordance with the flow of fluid through the outlet, a member of magnetic material carried by the float, sensing means magnetically controlled by said member in accordance with the vertical position of the float for controlling the aforesaid fluid outlet of the chamber, to modify the pressure in the chamber upon displacement of the member from a predetermined normal position relative to the sensing means, pneumatically actuated means for vertically moving the sensing means, and control valve means for said pneumatically actuated means, having a control element associated with the chamber and adjustable in accordance with the pressure therein, selectively to supply and discharge fluid respectively to and from the pneumatically actuated means to move the sensing means for restoration of the member in said normal position upon said displacement of the member therefrom, said pneumatically actuated means including a drive element connected to the sensing means, said pneumatically actuated means containing fluid under pressure which varies with the position of the drive element, said apparatus including means for transmitting a fluid pressure signal from the pneumatically actuated means, and said sensing means comprising a plurality of magnets disposed with respective regions of like polarity in mutually opposed relation at different sides of the vertical path of said member, said magnets being mounted for movement of said regions thereof in directions transverse of said path, and said magnets being disposed for mutual repulsion of said regions when said member is vertically remote from the sensing means and for diminution, by said member, of the said repulsion of said regions to the extent that the member extends into a vertical locality between said regions, the aforesaid normal position of the member being a position of partial presence in said locality for correspondingly diminished repulsion of the magnet regions, and means controlled by said magnets and responsive to departure of the force of repulsion between said regions to amounts both greater and less than a value of said force which corresponds to said normal position, for selectively adjusting the fluid outlet and thereby modifying the pressure in the chamber to effect adjustment of the control valve means for movement of the sensing means in a direction for the aforesaid restoration of the normal position of the member, said control valve means being arranged to interrupt operation of the pneumatically actuated means when the pressure in the chamber corresponds to said normal position.

12. Apparatus as defined in claim 11, wherein the float is vertically movable through a predetermined distance corresponding to a range of flows to be measured, and wherein said member has a vertical length at least about equal to said distance, whereby throughout said entire range of flows, any departure of the member entirely away from said locality and any disposition of the member so that a part of it wholly occupies said locality causes adjustment of the fluid outlet in a direction selected to move the sensing means for restoration of said normal member position, being a position where a predetermined end of the member lies at an intermediate point in said locality.

13. In apparatus for transmitting the measurements of a variable-area flowmeter, the combination with an upright flowmeter tube and a float vertically movable in accordance with changes in flow through the tube, of a chamber arranged to receive fluid under pressure from a source thereof and having an adjustable outlet, to provide variable pressure in the chamber in accordance with the flow of fluid through the outlet, a member of magnetic material carried by the float, sensing means magnetically controlled by said member in accordance with the vertical position of the float for controlling the aforesaid fluid outlet of the chamber, to modify the pressure in the chamber upon displacement of the member from a predetermined normal position relative to the sensing means, pneumatically actuated means for vertically moving the sensing means, and control valve means for said pneumatically actuated means, having a control element associated with the chamber and adjustable in accordance with the pressure therein, selectively to supply and discharge fluid respectively to and from the pneumatically actuated means to move the sensing means for restoration of the member in said normal position upon said displacement of the member therefrom, said pneumatically actuated means comprising a driving element moved in one direction by fluid under pressure and having spring means for displacing it in the opposite direction, so that the pressure of fluid in the pneumatically actuated means varies in accordance with the position of the driving element, and a driving connection intermediate said driving element and the sensing means, having means responsive to change of position of the element for modifying the relative positions of the element and sensing means in accordance with a predetermined relationship, whereby fluid pressure in the pneumatically actuated means measures the position of the float in accordance with a relationship different from a linear proportionality to float position, said pneumatically actuated means having means for transmitting a fluid pressure signal therefrom.

14. In apparatus for transmitting the measurements of a variable-area flowmeter, the combination with an upright flowmeter tube and a float vertically movable in accordance with changes in flow through the tube, of a vertically elongated member of magnetic material carried by the float, sensing means mounted to move vertically in alignment with the elongated member, said sensing means comprising a pair of magnets disposed upright with like polar portions at one end of each in respectively opposed relation at opposite sides of the vertical path of the elongated member, said magnets being mounted to rock about axes in a plane transverse of said path, and said magnets being disposed for mutual repulsion when the member is vertically remote from said sensing means, and for diminution, by said member, of the said repulsion of the magnets when and as the member is moved between them, chamber means arranged to receive fluid under pressure from a source thereof and having adjustable outlet means, to provide translatable change in pressure in the chamber means in response to change of fluid flow through the outlet, means controlled by the magnets and responsive to change of their forces of magnetic effect as translated angularly about said axes, for adjusting said outlet means, pneumatically actuated means for moving the sensing means vertically, and means controlled by the chamber means and responsive to change of the pressure therein caused by displacement of the member from a predetermined position between the magnets, for controlling the pneumatically actuated means to cause movement of the sensing means to a location where said member is restored to said predetermined position.

15. Apparatus as defined in claim 14, wherein the pneumatically actuated means comprises a second chamber, an element movable thereby in accordance with fluid supplied to the second chamber and connected to the sensing means for drive thereof in one direction, restoring means associated with said element and exerting force proportional to the position of said element, for driving the sensing means in the opposite direction, whereby fluid pressure in the second chamber varies in accordance with the position of the sensing means as displaced by said element, and means for transmitting a fluid pressure signal from the second chamber.

16. In apparatus for transmitting the measurements of a variable-area flowmeter, the combination with an upright flowmeter tube and a float vertically movable in accordance with changes in flow through the tube, of a member of magnetic material carried by the float and sensing means mounted to move vertically in alignment with the elongated member, said sensing means comprising a plurality of magnets disposed with respective regions of like polarity in mutually opposed relation at different sides of said path of the member, said magnets being mounted for movement of said regions thereof in directions transverse of said path, and said magnets being disposed for mutual repulsion of said regions when said member is vertically remote from said sensing means, and for diminution, by said member, of the said repulsion of said regions when and as the member is moved into a locality between said regions, means for displacing said sensing means along the path of the said member, and means controlled by the sensing means in response to change of the force of repulsion between said regions of the magnets, for controlling said displacing means to move the sensing means to restore the latter to a predetermined disposition of the member in said locality, upon displacement of said member from said disposition by vertical movement of the float.

17. Apparatus as defined in claim 16, wherein the float is vertically movable through a predetermined distance corresponding to a range of flows to be measured, and wherein said member has a vertical length at least about equal to said distance, said means controlled by the sensing means being responsive to values of the force of repulsion, between said regions of said magnets, which are respectively both greater and less than the value of such force occasioned by location of one end of the member at an intermediate position in said locality, for selectively causing the displacing means to move the sensing means in a direction to bring the sensing means to a place where said end of the member occupies said intermediate position, said means controlled by the sensing means interrupting movement of the sensing means when it reaches said place.

18. Apparatus as defined in claim 16, wherein the displacing means is pneumatically actuated and comprises a driving element moved in one direction by fluid under pressure and having spring means for displacing it in the opposite direction, so that the pressure of fluid in the displacing means varies in accordance with the position of the driving element, and a driving connection intermediate said driving element and the sensing means, having means responsive to change of position of the element for modifying the relative positions of the element and sensing means in accordance with a predetermined relationship, whereby fluid pressure in the pneumatically actuated means measures the position of the float in accordance with a relationship different from a linear proportionality to float position, said displacing means having means for transmitting a fluid pressure signal therefrom.

19. In apparatus for transmitting the measurements of a variable-area flowmeter, the combination with an upright flowmeter tube and a float vertically movable in accordance with changes in flow through the tube, of a vertically elongated member of magnetic material carried by the float and sensing means mounted to move vertically in alignment with the elongated member, said sensing means comprising a pair of magnets disposed upright with like polar portions at one end of each in respectively opposed relation at opposite sides of the path of the elongated member, said magnets being mounted to rock about axes in a plane transverse of said path, and said magnets being disposed for mutual repulsion when the elongated member is vertically remote from said sensing means, and for diminution, by said member, of the said repulsion of the magnets when and as the member moved between them, means for displacing said sensing means along the path of the said member, and means controlled by the sensing means in accordance with the force of repulsion of the magnets as translated angularly about their said axes, for controlling said displacing means to move the sensing means to restore the latter to a predetermined positional relationship to the elongated member, upon displacement of said member from said relationship by vertical movement of the float.

20. Apparatus as defined in claim 19, wherein the float is vertically movable through a predetermined distance corresponding to a range of flows to be measured, and wherein said elongated member has a vertical length at least about equal to said distance, said displacing means being arranged for selectively driving the sensing means in opposite vertical directions, said means controlled by the sensing means comprising means responsive to values of force of repulsion of the magnets respectively corresponding to departure of one end of the member in opposite directions from partial presence in a predetermined region of influence between the magnets, for selectively causing the displacing means to move the sensing means toward a position of said partial presence of the end of the member, said last-mentioned means being arranged to interrupt movement of the sensing means upon its arrival at said last-mentioned position.

21. Apparatus as defined in claim 20, wherein the means for displacing the sensing means comprises a driving element, pneumatic means for actuating the element, containing fluid under pressure which varies in proportion to the position of the element, and connecting means intermediate said element and the sensing means, said connecting means including means responsive to the position of said driving element for modifying the relative positions of said element and the sensing means in accordance with a predetermined relation so that as the sensing means is moved to follow displacements of the float-carried member, the positional change of the driving element follows a different relation to the positional change of the float, said pneumatic means having means for transmitting a fluid pressure signal therefrom.

22. In apparatus for transmitting the measurements of a variable-area flowmeter, the combination with an upright flowmeter tube and a float vertically movable in accordance with changes in flow through the tube, of chamber means arranged to receive fluid under pressure from a source thereof and having adjustable outlet means for fluid flow from the chamber means and having signal-controlling means operated in accordance with fluid conditions in the chamber means as modified by adjustment of said outlet means, magnetically-coacting float-position-detecting means comprising means of magnetic material and magnetized means, one of said coacting means being carried by the float for movement along a vertical path and the other of said coacting means being disposed adjacent said path, said other of said coacting means being mounted for movement toward and away from said path, for translation of changes of force on said other means which are governed by changes in the magnetic effect between said other means and the means carried by the float that are occasioned by change of position of the float-carried means, and means controlled by said other means and in accordance with the aforesaid force thereon for adjusting the aforesaid fluid outlet means, to effect response of the signal-controlling means to change of float position, said other coacting means being also arranged to be moved bodily vertically along the path of the float-carried coacting means, said adjustable outlet means comprising a valve mounted and mechanically carried with said other coacting means and adjustable in accordance with said changes of force exerted on said other coacting means in its aforesaid direction of movement transverse of said path, and said signal-controlling means having driving means connected to the said other coacting means for displacing the latter to follow vertical movements of the first coacting means upon adjustment of said valve in response to departure of said first coacting means from a predetermined positional relationship to said other coacting means.

23. In apparatus for transmitting the measurements of a variable-area flowmeter, the combination with an upright flowmeter tube and a float vertically movable in accordance with changes in flow through the tube, of magnetically-coacting float-position-detecting means comprising means of magnetic material and magnetized means, one of said coacting means being carried by the float for movement along a vertical path and the other of said coacting means being movable vertically in alignment with the float-carried coacting means, said other of said coacting means being also mounted for movement transversely toward and away from said path for translation of changes of force on said other means which are governed by changes in the magnetic effect between said other means and the float-carried means that are occasioned when and as the float-carried means is moved into a predetermined vertical region of influence of the said other coacting means, means for displacing said other coacting means along the path of the float-carried means, and means controlled by said other coacting means in response to change of the aforesaid force thereon, for controlling said displacing means to move said other coacting means to a predetermined vertical positional relation of said float-carried means in said region, upon departure of the float-carried means from said positional relation, said means for displacing said other coacting means comprising a driving element and connecting means intermediate said element and said other coacting means, said connecting means including means responsive to the position of said driving element for modifying the relative positions of said element and said other coacting means in accordance with a predetermined relation so that as said other coacting means is moved to follow displacements of the float-carried member, the positional change of the driving element follows a different relation to the positional change of the float, said apparatus including means for indicating the position of the driving element.

24. In apparatus for transmitting the measurements of a variable-area flowmeter, the combination with an upright flowmeter tube and a float vertically movable in accordance with changes in flow through the tube, of a vertically elongated member of magnetic material carried by the float, sensing means movable vertically in alignment with the member and including magnetized means movable toward and away from the path of the member, said magnetized means being biased outward from said path and being arranged for diminution, by magnetic effect of the member, of the force of outward bias to an extent corresponding with the presence of the member in a predetermined vertical region of the sensing means, means for displacing said sensing means along the path of the member, and means controlled by the magnetized means in response to the extent of diminution of outward bias thereof, for controlling said displacing means to move the sensing means to a predetermined position of partial presence of said member in said region, upon departure of the member from said position, said member being sufficiently long in vertical direction so that in all its positions, as carried by vertical movements of the float, in one vertical direction of departure from said predetermined position of partial presence it is always characterized by greater presence in said region than said predetermined partial presence, and in the opposite vertical direction of departure it is always characterized by less than said predetermined partial presence.

25. In apparatus for transmitting the measurements of a variable-area flowmeter, the combination with an upright flowmeter tube and a float vertically movable in accordance with changes in flow through the tube, of a vertically elongated member of magnetic material carried by the float, sensing means movable vertically in alignment with the member and including magnetic means responsive to departure of the member in either direction from a position of partial presence in a vertical region of said sensing means, means for displacing said sensing means along the path of the member, and means controlled by the magnetic means and responsive selectively to complete presence and complete absence of the member in said vertical region of the sensing means, for controlling said displacing means to move the sensing means to a location where said member again occupies said position of partial presence, said member being sufficiently long in vertical direction so that in remote positions, as carried by vertical movements of the float, in one vertical direction of departure from said position of partial presence it is always characterized by substantially complete presence in said region, and in the opposite vertical direction of departure it is always characterized by substantially complete absence in said region.

26. In apparatus for transmitting the measurements of a variable-area flowmeter, the combination with an upright flowmeter tube and a float vertically movable in accordance with changes in flow through the tube, of sensing means movable vertically along a path parallel to the movement of the float for detecting departure of the float from a predetermined positional relationship to the sensing means, and driving means controlled by the sensing means, for moving said sensing means to a locality where the float occupies said positional relationship, upon departure of the float from said relationship, whereby the sensing means follows the movements of the float said driving means comprising a driving element and connecting means between the element and the sensing means, including means responsive to the position of the driving element for modifying the relative positions of the element and the sensing means in accordance with a predetermined relation so that in moving the sensing means to follow the movements of the float, the driving element changes position in accordance with a relationship different from a linear proportionality to float position.

27. Apparatus as defined in claim 26, in which the driving element has associated means guiding it to move along a straight line path, and in which the sensing means includes a connecting element therefor movable therewith along the first-mentioned path and the aforesaid connecting means is arranged between the driving element and the connecting element and comprises a lever which carries a roller, said lever being pivoted to one of said elements to rock transversely of the path thereof and being directly linked to the other of said elements, the aforesaid position-modifying means including said lever and roller and also including means having a non-linear cam-surface along which said roller bears, said lever being biased to urge the roller against the cam surface, said lever, roller and cam surface being so constructed and arranged that movement of the connecting element correspondence to movement of the driving element as modified by the movement of the roller on the cam surface.

28. In apparatus for transmitting the measurements of a variable-area flowmeter, the combination with an upright flowmeter tube and a float vertically movable in accordance with changes in flow through the tube, of magnetically-coacting float-position-detecting means comprising means of magnetic material and magnetized means, one of said coacting means being carried by the float for movement along a vertical path and the other of said coacting means being movable vertically in alignment with the float-carried coacting means, said other of said coacting means being arranged to detect changes of magnetic effect between it and the float-carried coacting means that are occasioned when and as said float-carried means is moved into a predetermined vertical region of influence of said other coacting means, means for displacing said other coacting means along the path of the float-carried means, and means controlled by said other coacting means in response to change of said magnetic effect, for controlling said displacing means to move said other coacting means to a predetermined vertical positional relation of said float-carried means in said region, upon departure of the float-carried means from said positional relation, said means for displacing said other coacting means comprising a driving element and connecting means intermediate said element and said other coacting means, said connecting means including means responsive to the position of said driving element for modifying the relative positions of said element and said other coacting means in accordance with a predetermined relation so that as said other coacting means is moved to follow displacements of the float-carried member, the positional change of the driving element follows a different relation to the positional change of the float, said apparatus including means for indicating the position of the driving element.

29. In apparatus for transmitting the measurements of a variable-area flowmeter, the combination with an upright flowmeter tube and a float vertically movable in accordance with changes in flow through the tube, of a member of magnetic material carried by the float and sensing means arranged adjacent to the vertical path of the member, said sensing means comprising a plurality of magnets disposed with respective regions of like polarity in mutually opposed relation at different sides of said path of the member, said magnets being mounted for movement of said regions thereof in opposite directions, toward and away from each other, and said magnets being disposed for predetermined mutual repulsion of said regions when said member is vertically remote from said sensing means, and for less repulsion of said regions of the magnets when the member is interposed in a locality between said regions, and means controlled by said magnets and responsive to change of the force of repulsion between said regions thereof, for signaling change of position of said member, in its path, into and away from the aforesaid locality.

References Cited in the file of this patent

UNITED STATES PATENTS

| | | |
|---|---|---|
| 2,398,958 | Pellettere | Apr. 23, 1946 |
| 2,433,577 | Poole | Dec. 30, 1947 |
| 2,472,090 | Brewer | June 7, 1949 |
| 2,628,297 | Grauer | Feb. 10, 1953 |
| 2,715,705 | Barstow et al. | Aug. 16, 1955 |